United States Patent
Haans et al.

[11] 3,768,034
[45] Oct. 23, 1973

[54] GAS DISCHARGE LASER

[75] Inventors: Petrus Franciscus A. Haans; Petrus Johannes Antonius Strik, both of Emmansingel, Eindhoven, Netherlands

[73] Assignee: U.S. Philips Corporation, New York, N.Y.

[22] Filed: June 14, 1972

[21] Appl. No.: 262,564

Related U.S. Application Data

[63] Continuation of Ser. No. 81,275, Oct. 16, 1970, abandoned.

[52] U.S. Cl. .......................... 33/94.5 D, 331/94.5 G
[51] Int. Cl. ................................................ H01s 3/00
[58] Field of Search .................................. 331/94.5

[56] References Cited
UNITED STATES PATENTS

| | | | |
|---|---|---|---|
| 3,427,564 | 2/1969 | Okaya et al. | 331/94.5 |
| 3,451,009 | 6/1969 | Ross | 331/94.5 |

Primary Examiner—David Schonberg
Assistant Examiner—Conrad Clark
Attorney—Frank R. Trifari

[57] ABSTRACT

Instead of providing a quartz block with an aperture of small diameter, two rabbets are drilled in a wide tube in which plates are cemented which support a quartz tube of a small inner diameter. The construction is destined for a gas laser.

3 Claims, 1 Drawing Figure

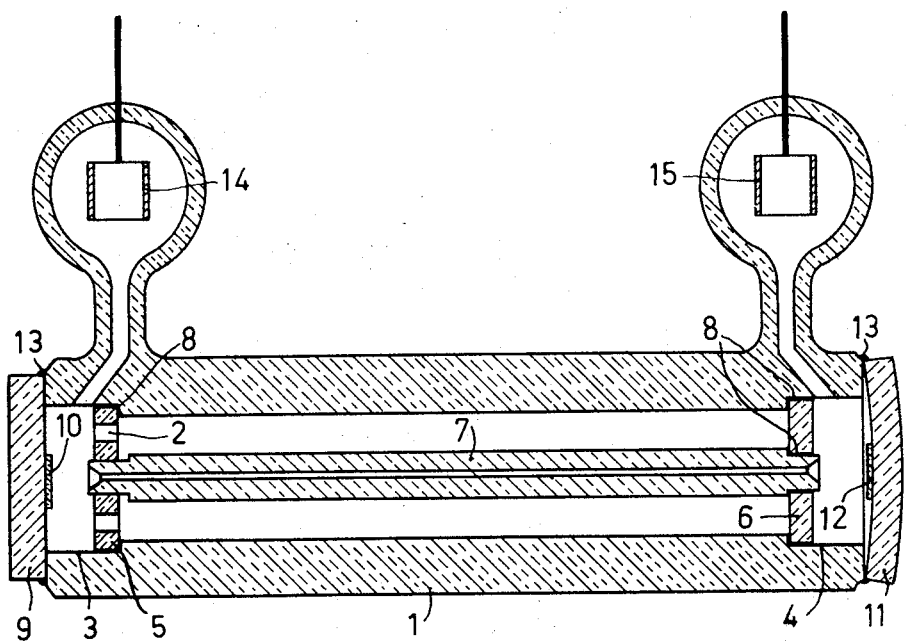

GAS DISCHARGE LASER

This is a continuation, of application Ser. No. 81,275, filed Oct. 16, 1970 and now abandoned.

The invention relates to a gas discharge laser in which the discharge occurs within a quartz body to which the reflectors are directly secured.

In the laser known from German Pat. No. 1,202,901, the solid quartz body comprises a narrow channel while the reflectors are wrung onto the ends of the quartz body or are cemented thereto.

When in the case of a confocal or semiconfocal arrangement the channel may have a diameter of only 1 mm in connection with the desirable mode selection, it is no longer possible to provide said channel by drilling.

It is the object of the invention to provide a simple construction.

In a gas discharge laser in which the gas discharge occurs within a quartz body to which the reflectors are directly secured, according to the invention the quartz body is in the form of a wide tube in which near the ends two plates fit in rabbets, said plates supporting a quartz tube having a small inner diameter.

Both the tube having the large diameter and the tube situated on the inside may consist of normally available material, in which rabbets are turned in the wide tube on the glass lathe while the ends of the inner tube are turned down until the correct fitting in the plate.

In order that the invention may be readily carried into effect, it will now be described in greater detail, by way of example, with reference to the accompanying drawing, in which reference numeral 1 denotes a quartz tube, 160 mm long, 40 mm outer diameter, 20 mm inner diameter. Rabbets 3 and 4, 25 mm diameter, are drilled near the ends. In said rabbets, plates 6 and 7 fit in which the turned down ends of the quartz tube 7 fit. The outside diameter of said tube is 12 mm and the inside diameter is 1 mm. The plates 5 and 6 are secured in rabbets by means of enamel 8 as is the case with the tube 7 in the plate 6. The tube 7 has a sliding fit in the plate 5. The plate 5 comprises a few holes 2 for compensating the pressure in the gas. On the left-hand side of the body 1 a reflector 9 is secured by means of cement 13. A dichroic layer 10 covers the flat plate 9. On the right-hand side a curved reflector 11, radius of curvature 19 cm, with dichroic layer 12 is present. This reflector is also secured by means of cement 13.

Electrodes 14 and 15 in side tubes serve to produce the discharge in the helium-neon mixture with an overall pressure of 3 Torr of which 10 percent consists of neon. The discharge tube serves to produce laser light of a wavelength of 6328 AU.

What is claimed is:

1. A gas discharge laser, comprising:
   A. a first hollow quartz body defining a substantially elongated tube-like structure;
   B. a pair of reflectors individually secured at each end of said tube-like structure, one of said reflectors being of an approximately planar configuration, and the other reflector being of a concave configuration;
   C. a pair of plates each affixed at opposite ends of said tube-like structure in juxtaposition to the reflectors, said plates containing apertures for receipt of a second quartz body;
   D. first and second dichroic layers each disposed upon said reflectors;
   E. a second quartz body defining an elongated tube-like structure having a hollow center portion, said second tube-like structure rigidly secured at one end thereof to one of the plates, and slidably mounted at its other end to the other plate, so as to align the hollow center portion opposite said dichroic layers; and,
   F. a pair of electrodes for producing said discharge, each mounted at opposite ends of said first quartz body and communicating to the interior thereof.

2. The combination of claim 1, wherein one of said apertured plates is provided with a plurality of holes for gas pressure compensation.

3. The combination of claim 1, wherein the discharge occurs in a gaseous helium neon mixture with an overall pressure of 3 Torr, of which 10% consists of neon.

* * * * *

PO-1050
(5/69)

UNITED STATES PATENT OFFICE
CERTIFICATE OF CORRECTION

Patent No. 3,768,034  Dated October 23, 1973

Inventor(s) PETRUS FRANCISCUS A. HAANS ETAL

It is certified that error appears in the above-identified patent and that said Letters Patent are hereby corrected as shown below:

IN THE TITLE PAGE

After "[21] Appl. No.: 262,564" insert the following as two separate lines,

--[30] Foreign Application Priority Data
Oct. 18, 1969 - Dutch - 6915791--

Signed and Sealed this twenty-fourth Day of February 1976

[SEAL]

Attest:

RUTH C. MASON
Attesting Officer

C. MARSHALL DANN
Commissioner of Patents and Trademarks